United States Patent
Nakagawa

(10) Patent No.: US 8,049,911 B2
(45) Date of Patent: Nov. 1, 2011

(54) IMAGE FORMING APPARATUS INCLUDING IMAGE ABNORMALITY DETECTION, METHOD OF CONTROLLING THE SAME, AND PROGRAM FOR IMPLEMENTING THE METHOD

(75) Inventor: Atsushi Nakagawa, Toride (JP)

(73) Assignee: Canon Kabushiki Kaisha (JP)

( * ) Notice: Subject to any disclaimer, the term of this patent is extended or adjusted under 35 U.S.C. 154(b) by 981 days.

(21) Appl. No.: 11/300,576

(22) Filed: Dec. 14, 2005

(65) Prior Publication Data

US 2006/0126099 A1    Jun. 15, 2006

(30) Foreign Application Priority Data

Dec. 14, 2004    (JP) .................... 2004-361820
Nov. 17, 2005    (JP) .................... 2005-333173

(51) Int. Cl.
*G06K 15/00* (2006.01)
*G06K 9/00* (2006.01)

(52) U.S. Cl. ...... 358/1.14; 358/1.18; 358/504; 382/112; 399/15; 399/29; 399/45; 399/67

(58) Field of Classification Search .............. 358/1.14, 358/3.26, 408, 488, 493, 496, 498; 399/17, 399/18, 19, 20, 21, 73, 85, 205, 364, 274, 399/382; 270/52.01, 52.03, 52.04, 52.06, 270/58.31; 355/23, 24; 382/112

See application file for complete search history.

(56) References Cited

U.S. PATENT DOCUMENTS

| | | | | |
|---|---|---|---|---|
| 4,630,129 | A * | 12/1986 | Hayashi et al. | 358/296 |
| 5,311,255 | A * | 5/1994 | Josephson | 399/6 |
| 5,845,057 | A * | 12/1998 | Takeda et al. | 358/1.15 |
| 6,453,133 | B1* | 9/2002 | Osari et al. | 399/82 |
| 6,898,382 | B2* | 5/2005 | Shibaki | 399/16 |
| 7,054,017 | B2* | 5/2006 | Terrill et al. | 358/1.14 |
| 7,259,877 | B2* | 8/2007 | Inoo et al. | 358/1.13 |
| 7,969,592 | B2* | 6/2011 | Bonikowski et al. | 358/1.14 |
| 2003/0190169 | A1* | 10/2003 | Shibaki | 399/21 |
| 2004/0080774 | A1* | 4/2004 | Owen et al. | 358/1.14 |

(Continued)

FOREIGN PATENT DOCUMENTS

EP    1 199 677 A2    9/2001

(Continued)

OTHER PUBLICATIONS

Kaneo Hiroshi,"Printer System, Page recovery print controller, page recovery print method and spool program" Feb. 14, 2003, JP 2003-044239 English Translation.*

*Primary Examiner* — Twyler Haskins
*Assistant Examiner* — Dennis Dicker
(74) *Attorney, Agent, or Firm* — Rossi, Kimms & McDowell LLP

(57) ABSTRACT

An image forming apparatus which eliminates the necessity of carrying out wasteful operations such as retry of a job and therefore improves work efficiency. A print job is carried out to thereby form an image on a recording sheet. When an image abnormality formed on the recording sheet is detected, a controller temporarily suspends the print job. An operating unit displays a screen for prompting a user to input an instruction as to whether to continue the print job. The controller determines whether to continue the print job based on the instruction input by the user.

10 Claims, 15 Drawing Sheets

U.S. PATENT DOCUMENTS

2005/0238205 A1 * 10/2005 Kimura et al. ................ 382/112

FOREIGN PATENT DOCUMENTS

| JP | 5-24321 A | 2/1993 |
| --- | --- | --- |
| JP | 5-216308 A | 8/1993 |
| JP | 11-078183 A | 3/1999 |
| JP | 11-193152 A | 7/1999 |
| JP | 11-305976 A | 11/1999 |
| JP | 2002-137458 A | 5/2002 |
| JP | 2002-333744 A | 11/2002 |
| JP | 2003-044239 A | 2/2003 |
| JP | 2003-136818 A | 5/2003 |
| JP | 2003-170643 A | 6/2003 |
| JP | 2004-243746 A | 9/2004 |

* cited by examiner

IMAGE FORMING APPARATUS INCLUDING IMAGE ABNORMALITY DETECTION, METHOD OF CONTROLLING THE SAME, AND PROGRAM FOR IMPLEMENTING THE METHOD

CROSS REFERENCE TO RELATED APPLICATION

This application claims priority from Japanese Patent Application Nos. 2004-361820 filed Dec. 14, 2004, and 2005-333173 Nov. 17, 2005, which are hereby incorporated by reference herein.

BACKGROUND OF THE INVENTION

1. Field of the Invention

The present invention relates to an image forming apparatus that detect an image abnormality formed on a recording sheet, a method of controlling the same and a program for implementing the method.

2. Description of the Related Art

Conventionally, there has been image forming apparatuses that have an image abnormality detecting function of detecting the presence or absence of an image abnormality formed on a sheet and automatically stopping the apparatus according to the detection result (see Japanese Laid-Open Patent Publication (Kokai) No. 2003-136818, for example).

With the image abnormality detecting function, an image printed on a sheet by a printing section of a printer apparatus is photoelectrically read by am image reader provided on a sheet conveying path, and the resulting image is expanded in an image memory. A form frame image of a part common to all the pages, which is included in the image expanded in the image memory, is compared with a form frame image as a reference which is stored in advance in a storage device. Based upon the comparison result, an image quality abnormality detecting section detects the presence or absence of an image abnormality in the image quality printed on the sheet. When an image abnormality is detected, printing is stopped.

Thus, with the conventional image abnormality detecting function, the apparatus is automatically stopped when an image abnormality such as skewing of a sheet or density trouble of an image formed is detected. Reference values for use in determining whether or not there is an image abnormality such as skewing of a sheet or density trouble are usually set to values corresponding to a high-quality image. Thus, the possibility that even an image that is not required to have a high quality is determined as being abnormal is increased. In other words, there is the possibility that even an image that can be allowed by a user is determined as being abnormal, and therefore the number of times the apparatus is stopped is increased. As a result, wasteful operations such as retry of a job are required, considerably reducing work efficiency.

SUMMARY OF THE INVENTION

It is an object of the present invention to provide an image forming apparatus, a method of controlling the same that solve the above described problems, and a program for implementing the method.

It is another object of the present invention to provide an image forming apparatus and a method of controlling the same that, after an image abnormality is detected, enable a user to review an image formed on a sheet and determine subsequent processing to be performed, and a program for implementing the method.

To attain the above object, in a first aspect of the present invention, there is provided an image forming apparatus comprising an operating unit that displays information for a user and inputs an instruction from the user, an image forming unit that carries out a print job to thereby form an image on a recording sheet, an abnormality detecting unit that detects an image abnormality formed on the recording sheet after the image is formed on the recording sheet by the image forming unit, a controller that temporarily suspends the print job when the image abnormality detecting unit detects the image abnormality, and a display controller that causes the operating unit to display a screen for prompting the user to give an instruction as to whether to continue the print job after the print job is suspended, wherein the controller determines whether to continue the print job based on the instruction input from the operating unit by the user.

Preferably, the display controller causes the operating unit to display to identification information for identifying the recording sheet of which abnormality has been detected when the abnormality detecting unit detects the image abnormality.

More preferably, the display controller causes the operating unit to display contents of the detected abnormality when the abnormality detecting unit detects the image abnormality.

Preferably, the image forming unit comprises a fixing unit that fixes the image onto the recording sheet, and the abnormality detecting unit comprises an image sensor provided at a location downstream of the fixing unit.

More preferably, the image forming apparatus comprises a sheet inverting unit that inverts the recording sheet onto which the image has been fixed by the fixing unit, and wherein the image sensor is provided in the sheet inverting unit.

Preferably, the image forming apparatus comprises a registering unit that registers the image abnormality detected by the abnormality detecting unit as history information.

Specifically, in the case where the user has given an instruction for discontinuing the print job, the display controller causes the operating unit to display a screen for prompting the user to give an instruction as to whether to cancel the print job and the controller determines whether to cancel the print job based on the instruction from the user.

Specifically, in the case where the user has given an instruction for discontinuing the print job, the display controller causes the operating unit to display a screen for prompting the user to give an instruction as to a page of the print job from which reprinting is to be performed and the controller controls resumption of the print job based on the instruction from the user.

Specifically, in the case where the user has given an instruction for discontinuing the print job, the controller designates a page from which image formation is to be retried based on an input from the user and then determines whether to resume image formation from the designated page or to cancel the print job.

More specifically, the abnormality detecting unit detects one of density trouble of the image formed on the recording sheet and skewing of the recording sheet based on an output from the image sensor.

Specifically, the image forming apparatus comprises a temporary holding unit that holds recording sheets of which abnormalities have been detected by the abnormality detecting unit in a manner being distinguished from recording sheets of which abnormalities have not been detected.

To attain the above object, in a second aspect of the present invention, there is provided a method of controlling an image forming apparatus, comprising an image forming step of carrying out a print job to thereby form an image on a recording sheet, an abnormality detecting step of detecting an image abnormality of the image formed on the recording sheet after the image is formed on the recording sheet in the image forming step, a suspending step of temporarily suspending the print job when the image abnormality is detected in the abnormality detecting step, an input step of waiting for a user to input an instruction as to whether to continue the print job after the print job is suspended, and a determining step of determining whether to continue the print job based on the instruction input by the user.

Preferably, the method of controlling the image forming apparatus comprises a notifying step of notifying identification information for identifying the recording sheet of which abnormality has been detected to the user when the image abnormality is detected in the abnormality detecting step.

More preferably, contents of the detecting abnormality is notified to the user in the notifying step.

Preferably, the method of controlling the image forming apparatus comprises a second input step of, in the case where it is determined that the print job is to be discontinued, waiting for the user to input an instruction as to whether to cancel the print job, and a second determining step of determining whether to cancel the print job based on the instruction input by the user.

More preferably, the method of controlling an image forming apparatus comprises a third determining step of, in the case where it is determined that the print job is to be discontinued, waiting for a user to input an instruction as to a page of the print job from which reprinting is to be performed, and a resumption control step of controlling resumption of the print job based on the instruction input by the user in the third input step.

To attain the above object, in a third aspect of the present invention, there is provided a program for causing a computer to execute a method of controlling an image forming apparatus, comprising an image forming module for carrying out a print job to thereby form an image on a recording sheet, an abnormality detecting module for detecting an image abnormality formed on the recording sheet after the image is formed on the recording sheet in the image forming module, a suspending module for temporarily suspending the print job when the image abnormality is detected in the abnormality detecting module, an input module for waiting for a user to input an instruction as to whether to continue the print job after the print job is suspended, and a determining module for determining whether to continue the print job based on the instruction input by the user.

The above and other objects, features, and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing preferred embodiments thereof.

First Embodiment

Figure 1:
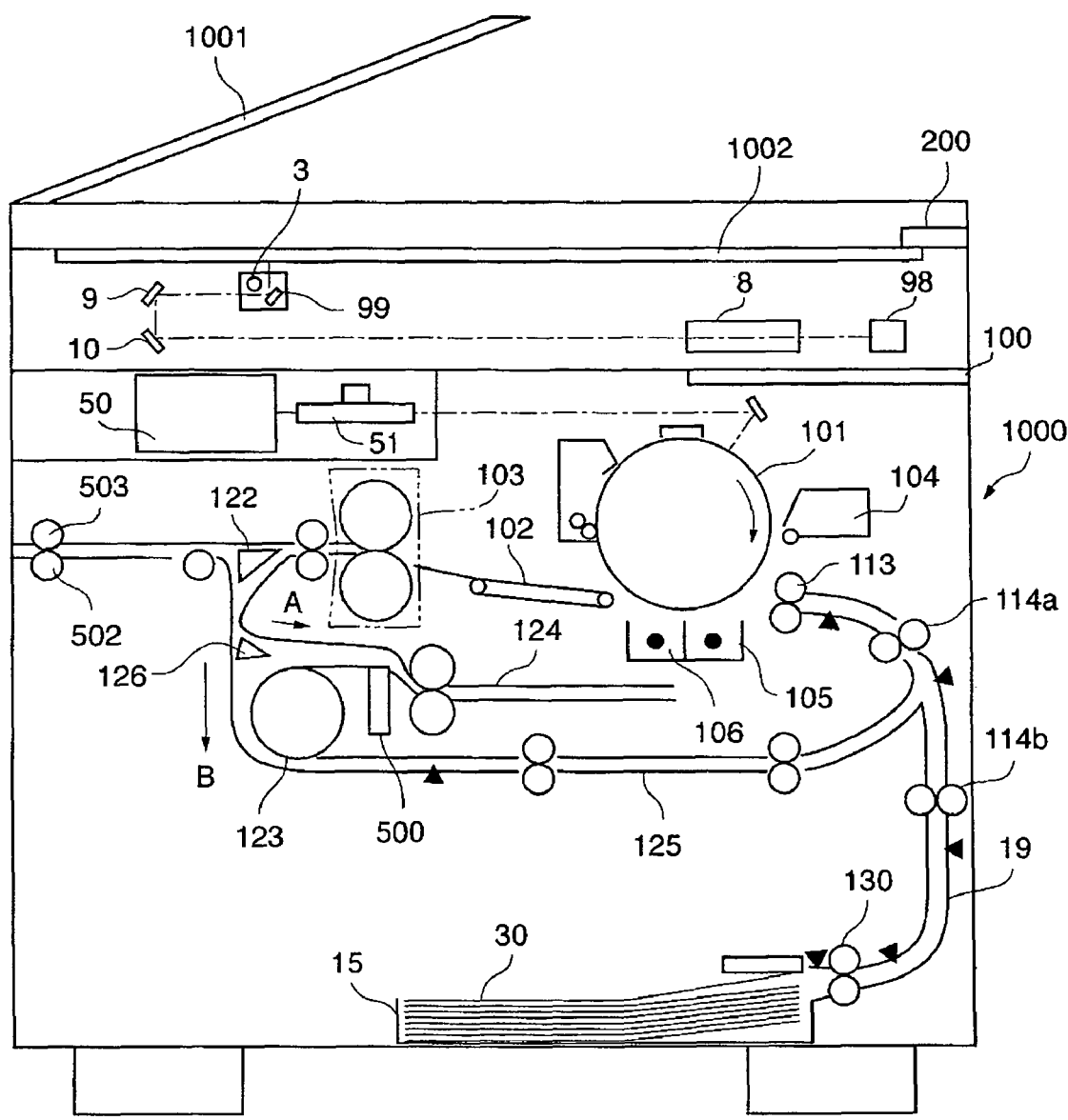
FIG. 1 is a longitudinal sectional view showing the construction of an image forming apparatus according to a first embodiment of the present invention.
Figure 2:
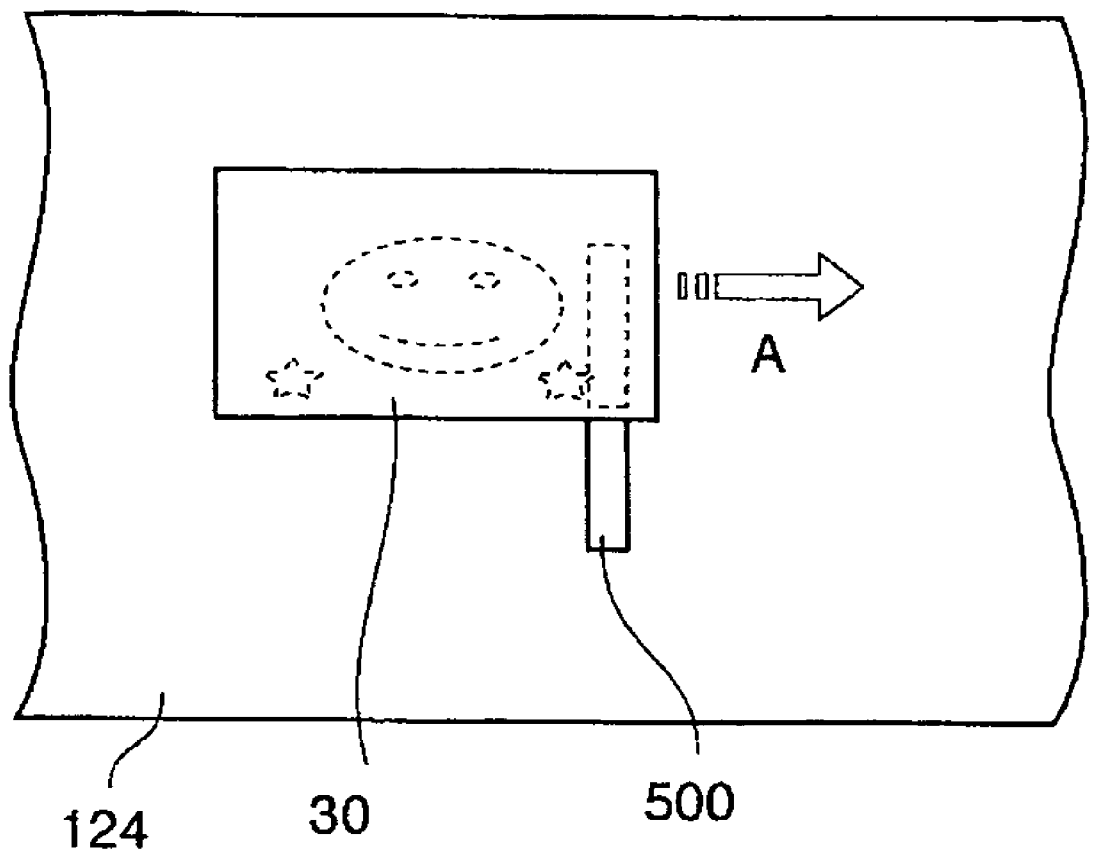
FIG. 2 is a plan view showing a line sensor disposed in the vicinity of an entrance of a sheet inverting path appearing in FIG. 1 as viewed from above.

FIG. 1 is a longitudinal sectional view showing the construction of an image forming apparatus according to a first embodiment of the present invention, and FIG. 2 is a plan view showing a line sensor 500, which is disposed in the vicinity of an entrance of a sheet inverting path 124 appearing in FIG. 1, as viewed from above.

As shown in FIG. 1, the image forming apparatus 1000 according to the present embodiment is equipped with an automatic original feeder 1001 that feeds originals one by one onto an original platen glass 1002. When an original is fed to a predetermined location on the original platen glass 1002 by the automatic original feeder 1001, an optical lamp 3 lights up to illuminate the original on the original platen glass 1002. Reflected light from the original is guided to an optical lens 8 via a first mirror 99 and a plurality of second mirrors 9 and 10, and forms an image on an image pickup device 98 such as a CCD (charge coupled device). The image pickup device 98 outputs the formed optical image into an electric signal and outputs the same. The electric signal is subjected to predetermined processing by an A/D converter, an image processor, not shown, and so forth and then output as image data to a laser controller 50. The laser controller 50 drivingly controls a laser emitting section 51 based on the image data. A laser beam emitted from the laser emitting section 51 is irradiated onto a photosensitive member 101 while being scanned. The laser beam forms a latent image on the photosensitive member 101, and the latent image is visualized as a toner image by toners supplied from a developing unit 104.

The toner image on the photosensitive member 101 is transferred onto a sheet 30 fed from a sheet feeding section 15 by a transfer section 105. The sheet 30 onto which the toner image has been transferred is separated from the photosensitive member 101 by a transfer separating section 106 and then conveyed to a fixing unit 103 via a conveying belt 102. The fixing unit 103 fixes the toner image onto the sheet 30 by applying thermal pressure to the toner image. The sheet 30 onto which the toner image has been fixed is guided by a switching flapper 122 to the sheet inverting path 124 for inverting the sheet 30 (i.e. the sheet 30 is guided in a direction indicated by an arrow A) and then discharged to a finisher, not shown, by a pair of sheet discharge rollers 502 and 503. Thus, the sheet 30 is discharged to the finisher with a surface thereof on which the toner image is formed facing downward. This discharge mode is referred to as face down discharge.

In the case where a double-sided copy mode is set, a sheet 30 having an image formed on one side thereof is guided to the sheet inverting path 124 by the switching flapper 122. Thereafter, the sheet 30 is guided by a flapper 126 in a direction indicated by an arrow B and then fed toward the photosensitive member 101 again via a sheet re-feeding roller 123 and a sheet re-feeding path 125. A toner image is transferred onto the other side of the re-fed sheet 30, and after the toner image is fixed, the sheet 30 is discharged to the finisher by the sheet discharge rollers 502 and 503.

A plurality of sheets 30 can be stacked on the sheet feeding section 15. The sheets 30 stacked on the sheet feeding section 15 are conveyed one by one to resist rollers 113 via sheet feeding rollers 130, a sheet feeding path 19, and conveying rollers 114b and 114a. The sheet 30 is temporarily stopped at the present position by the resist rollers 113 and then fed in synchronization with timing in which an image is formed on the photosensitive member 101.

The line sensor 500 is disposed in the vicinity of the entrance of the sheet inverting path 124. The line sensor 500 is implemented by a CIS (contact image sensor) comprised of a photoelectric elements array. The line sensor 500 is used to detect image abnormalities such as skewing of sheets 30 and density trouble. Specifically, as shown in FIG. 2, the line sensor 500 is disposed below the sheet inverting path 124, for reading a surface of the sheet 30 on which an image is formed, the sheet 30 being conveyed on the sheet inverting path 124 in a direction indicated by the arrow A. In the present embodiment, edge of the sheet 30 in the conveying direction are detected by the line sensor 500, and whether or not the sheet 30 is skewed is determined based on the amount of misalignment of the edge. Also, an image formed on a sheet 30 is read by the line sensor 500, and information (e.g. density information) acquired from the read image is compared with its reference value to thereby detect density trouble, for example. In a copy mode, values based on densities of a read original image and an output image density set by the user through the operating section are set as the reference values. In the case where an automatic density adjusting function is selected, the reference values are set based on adjusted densities and densities of a read original image.

In a printer mode, the reference values are set based on image data and various parameter values included in print data received from a computer.

For example, the maximum value, the minimum value, and the average value of densities of a read original image are obtained and multiplied by a coefficient determined in dependence on an output image density adjusted by the user or automatically to obtain reference values of the maximum value, the minimum value, and the average value. The maximum value, the minimum value, and the average value of densities of an image formed on a sheet are detected and compared with their respective reference values. If any of the detected values is greater or smaller than its reference value by not less than a predetermined value, it is determined that density trouble occurs.

It should be noted that whether density trouble occurs or not may be determined using another algorithm.

Also, since the line sensor 500 is provided on the sheet inverting path 124, the probability of failure of the image forming apparatus 1000 caused by heat from the fixing unit can be reduced.

Even if the distance between the fixing unit and the sheet discharge port is short, the line sensor 500 can be installed insofar as there is a sheet inverting path, and therefore the width of the image forming 1000 apparatus can be reduced.

The above-mentioned image abnormalities such as skewing of a sheet and density trouble are detected sheet by sheet. In each print job, the number of sheets is counted so that a sheet of which image abnormality has been detected can be identified. What page number of what copy number is a sheet of which image abnormality has been detected is found from the number of sheets counted. The number of sheets is counted each time the line sensor 500 detects the leading edge of a sheet. It should be noted that the number of sheets may be counted using another counting method.

In a one-sided copy mode, a sheet 30 having an image formed on one side thereof is guided once to the sheet inverting path 124 for face down discharge and subjected to the above-mentioned image abnormality detection. On the other hand, in a double-sided copy mode, a sheet 30 having an image formed on one side thereof is guided once to the sheet inverting path 124 and subjected to the above-mentioned image abnormality detection, and thereafter, the sheet 30 is guided to the sheet re-feeding path 125. A detailed description of how the sheet 30 is conveyed and subjected to image abnormality detection in the double-sided copy mode will be given later.

The image forming apparatus 1000 is equipped with a controller 100 and an operating section 200. The controller 100 is comprised of a CPU, a ROM, a RAM, etc. and, for example, driving controls the automatic original feeder 1001, the photosensitive member 101, the rollers, the fixing unit 103, etc. and controls the execution of processing therefor. The operating section 200 is comprised of a touch-sensitive liquid crystal display panel and various hard keys and, for example, sets a mode and inputs the number of copies. Information input from the operating section 200 is transferred to the controller 100. Information indicative of a set mode, the contents thereof, and so forth are displayed on the liquid crystal display panel as required.

Figure 3A:
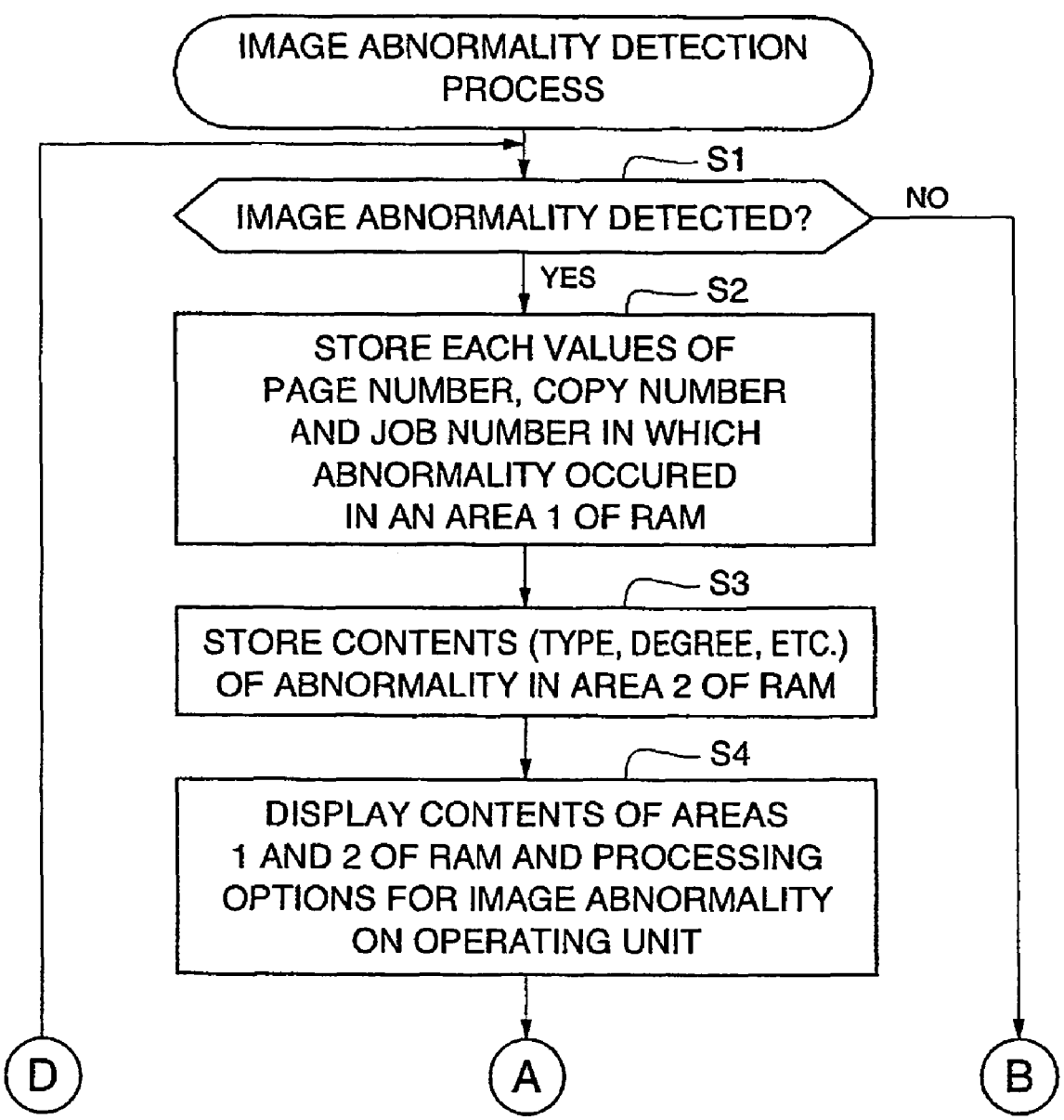
FIG. 3 is a flow chart showing the procedure of a process carried out in the case where an image abnormality (skewing or density trouble) of the image forming apparatus shown in FIG. 1 is detected.
Figure 3B:
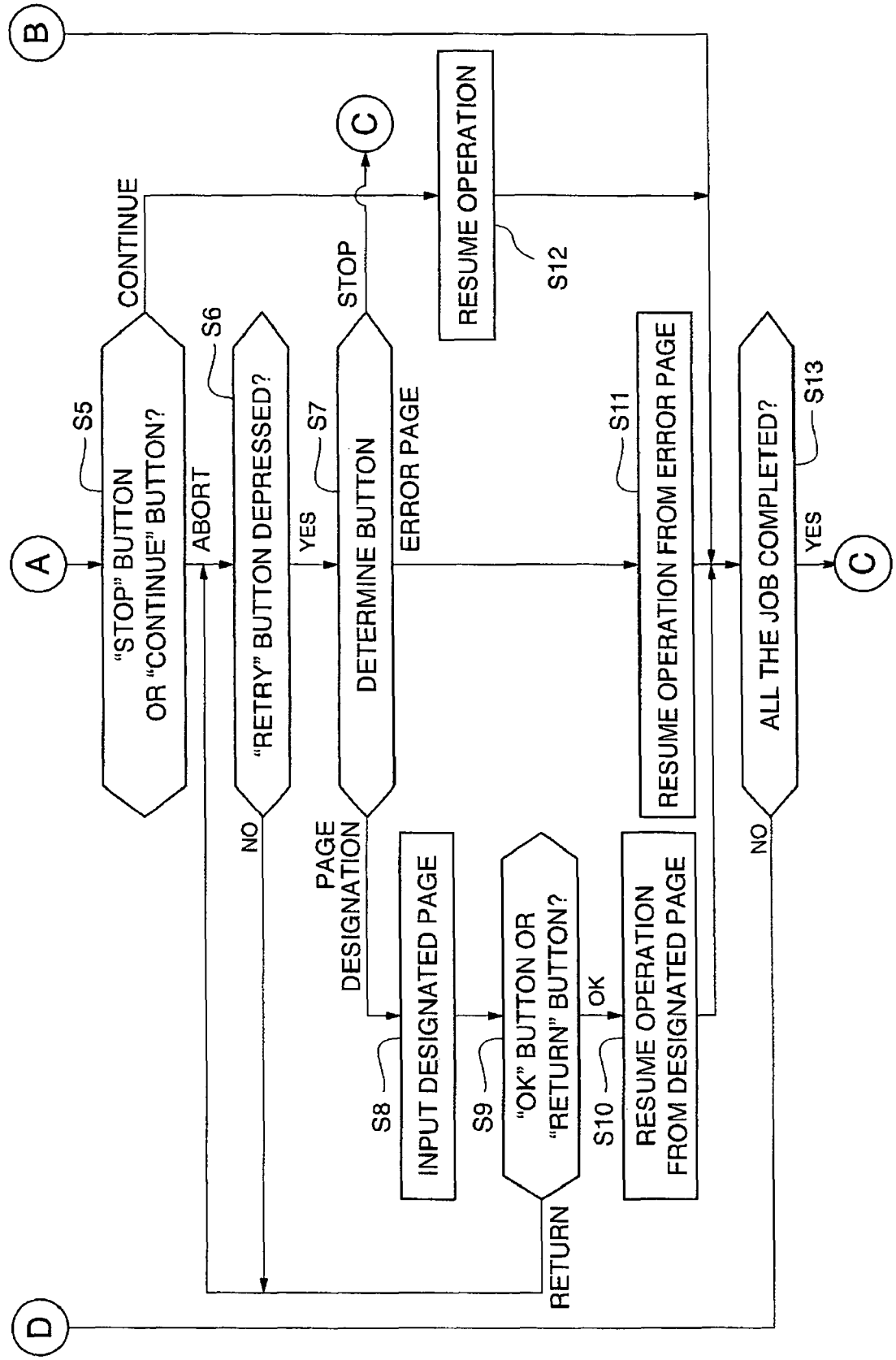
Figure 4:
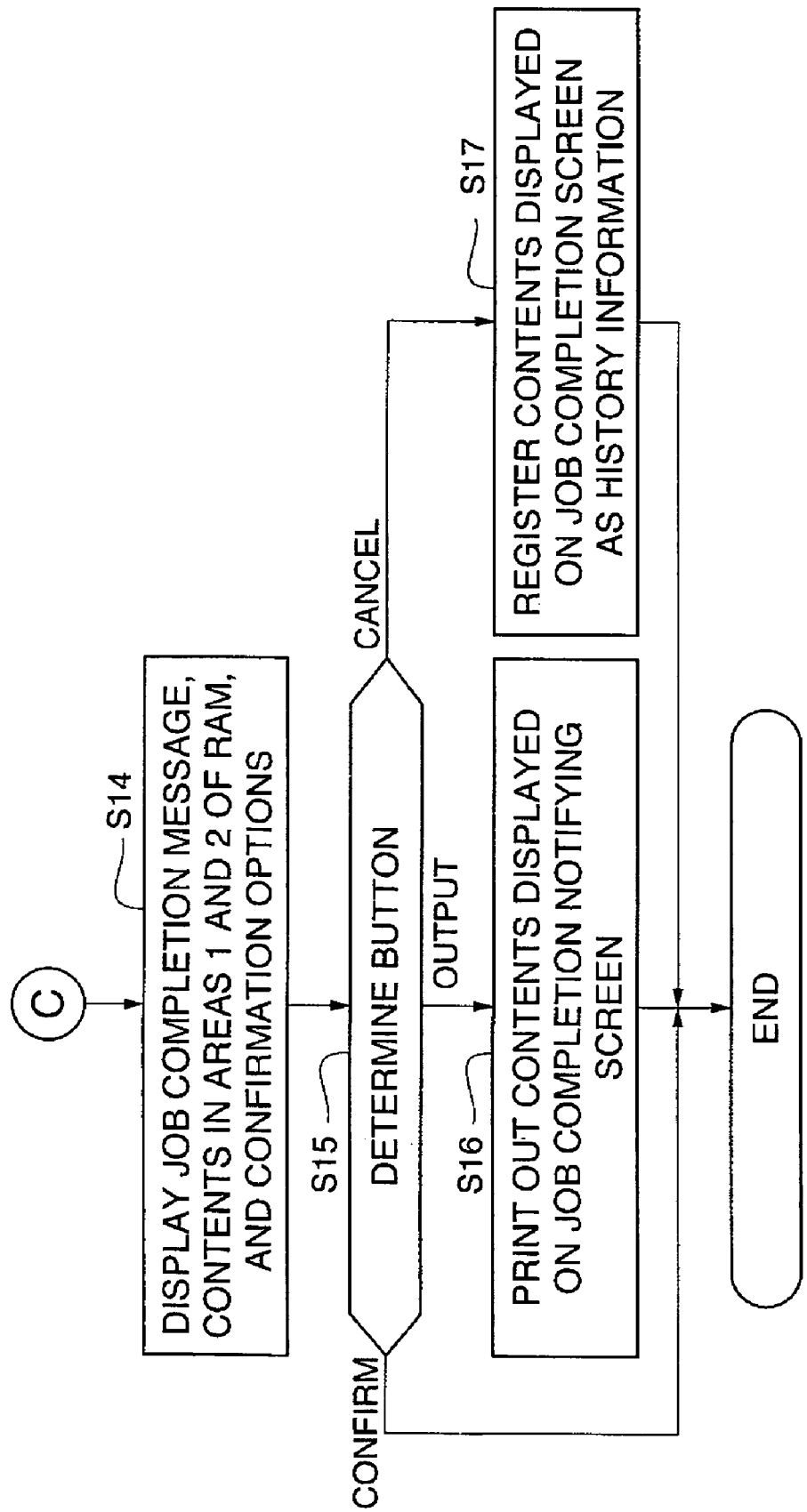
FIG. 4 is a flow chart showing the procedure of a process carried out in the case where an image abnormality (skewing or density trouble) of the image forming apparatus shown in FIG. 1 is detected.
Figure 5:
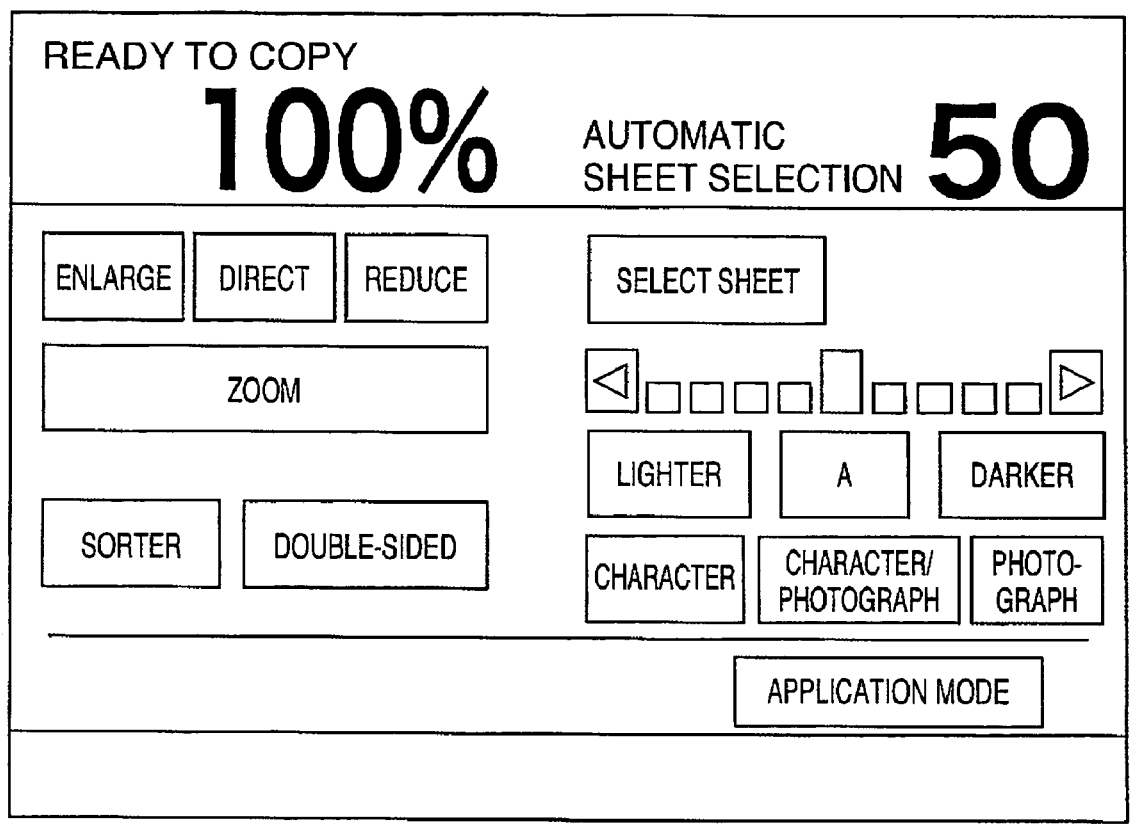
FIG. 5 is a view showing an example of an initialization screen displayed on an operating section appearing in FIG. 1.
Figure 6:
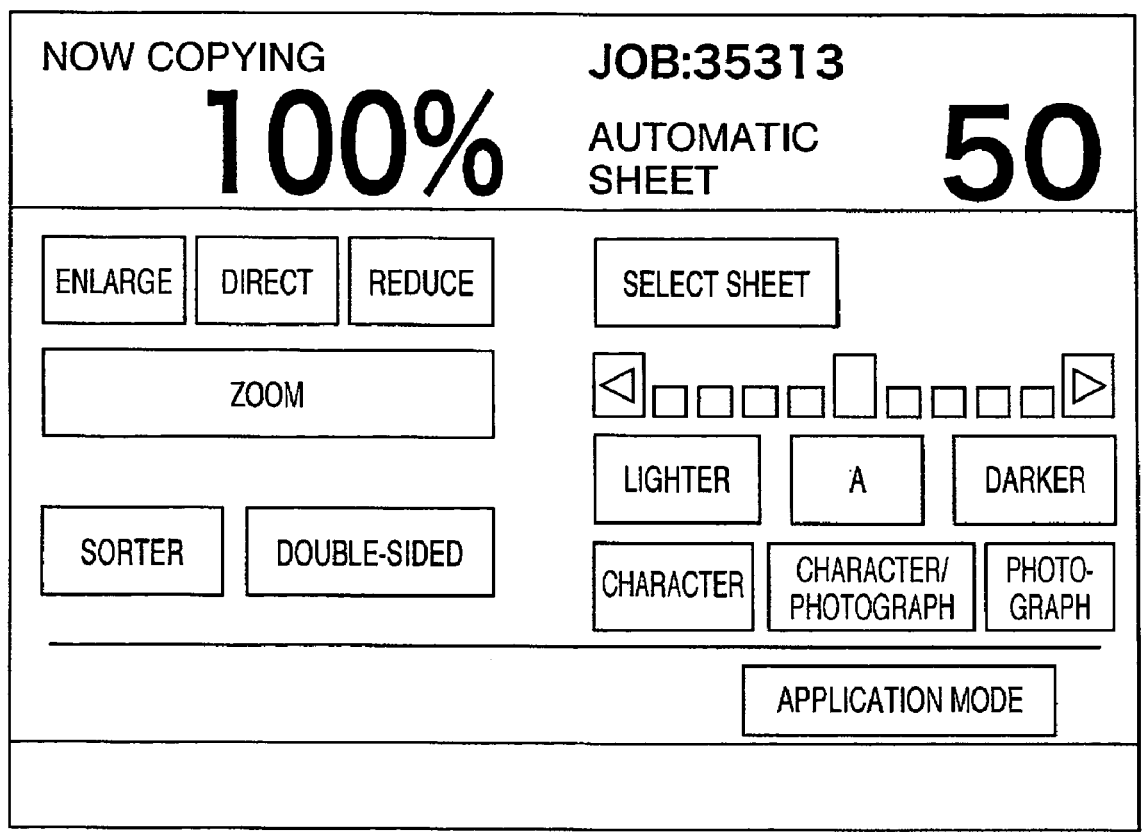
FIG. 6 is a view showing an example of a screen displayed on the operating section during one-sided copying.
Figure 7:
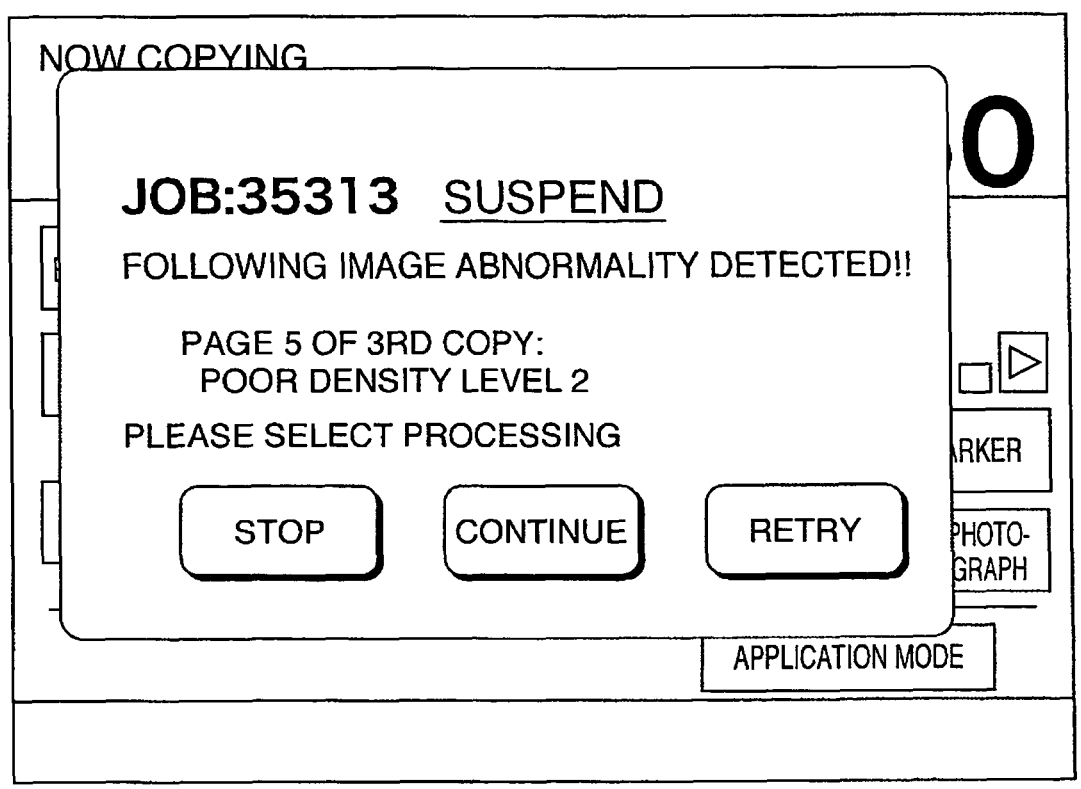
FIG. 7 is a view showing an example of an image abnormality notifying screen displayed on the operating section.
Figure 8:
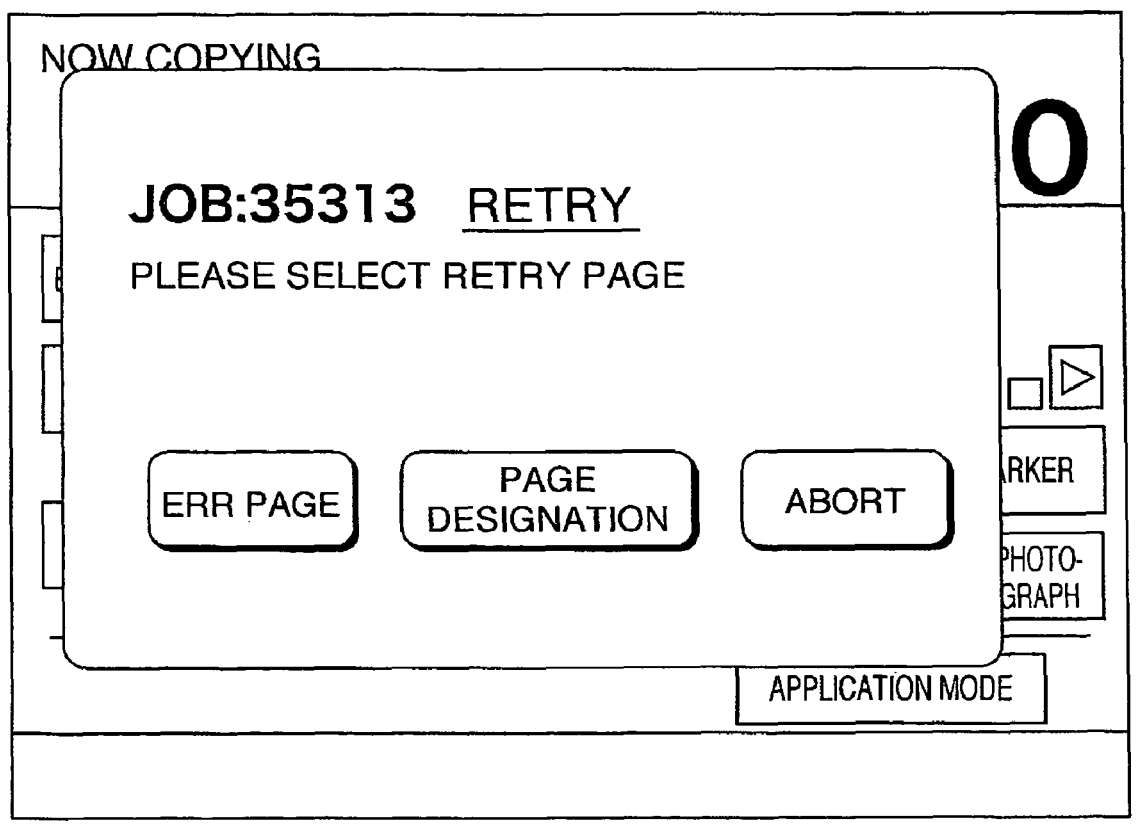
FIG. 8 is a view showing an example of a retry screen displayed in the case where a "Retry" button is selected on the image abnormality notifying screen in FIG. 7.
Figure 9:
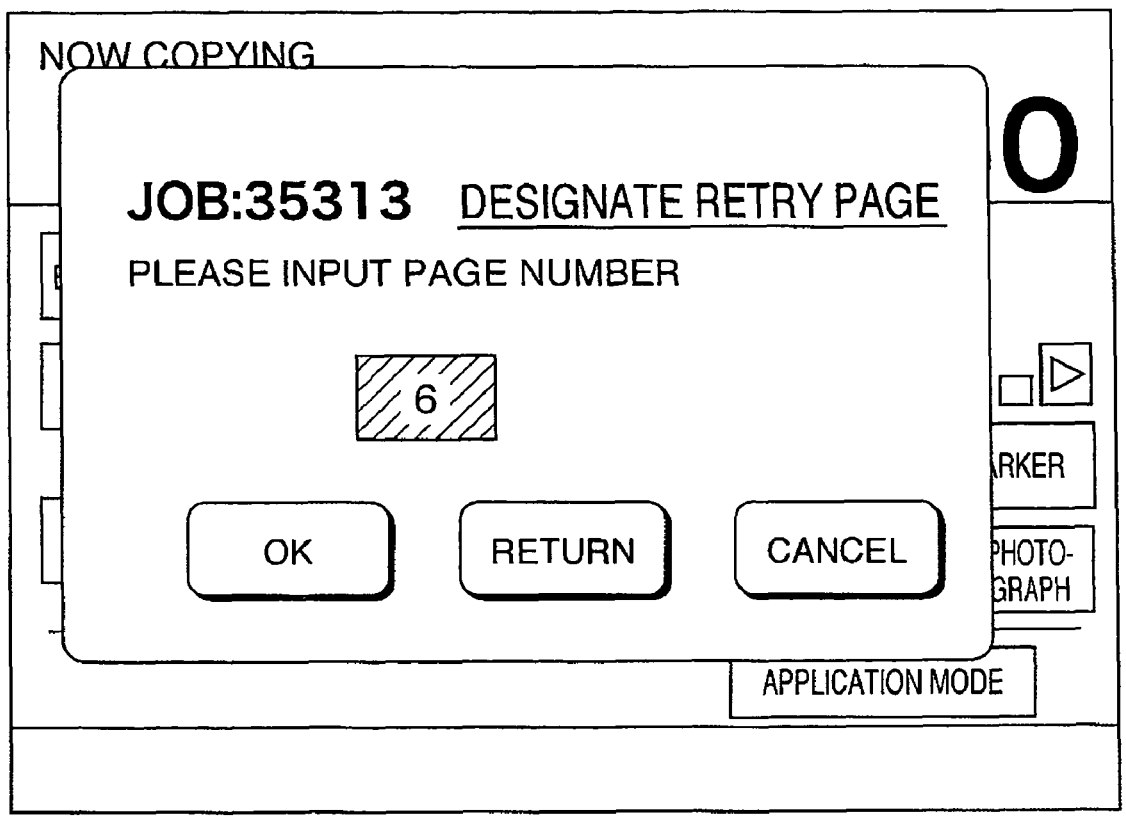
FIG. 9 is a view showing an example of a retry page number designating screen displayed on the operating section.
Figure 10:
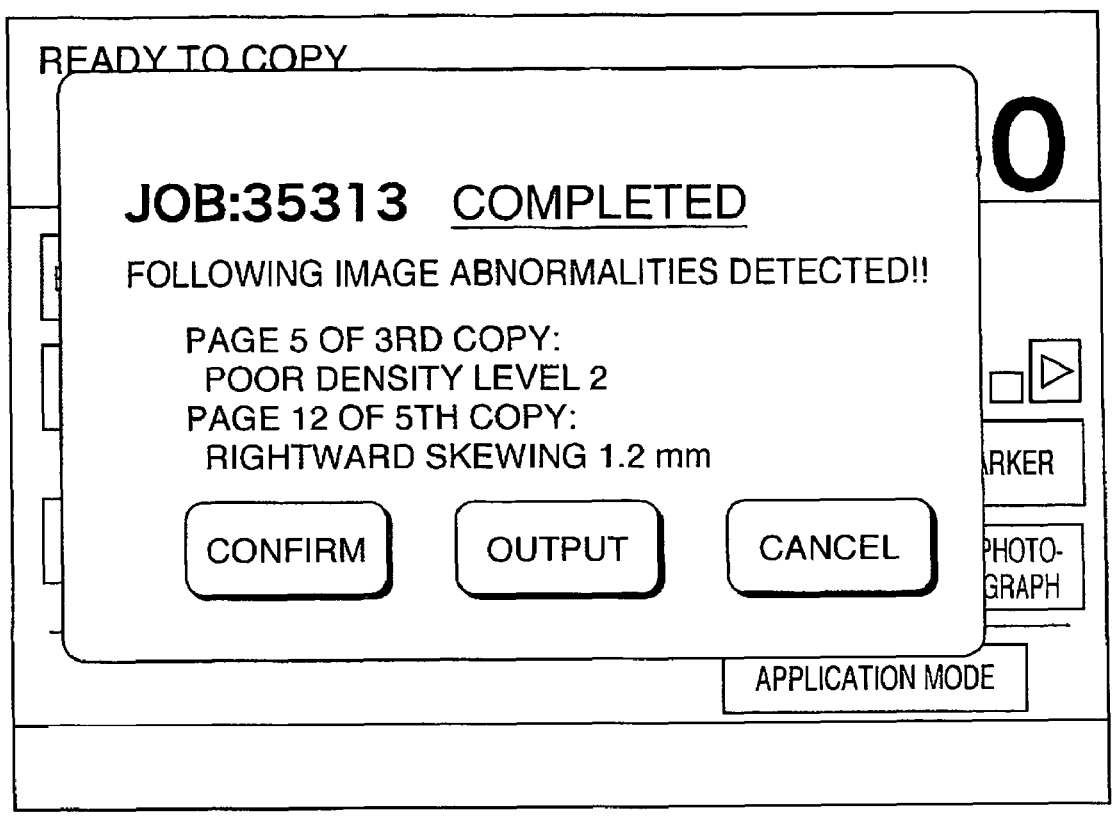
FIG. 10 is a view showing an example of a job completion notifying screen displayed on the operating section.
Figure 11:
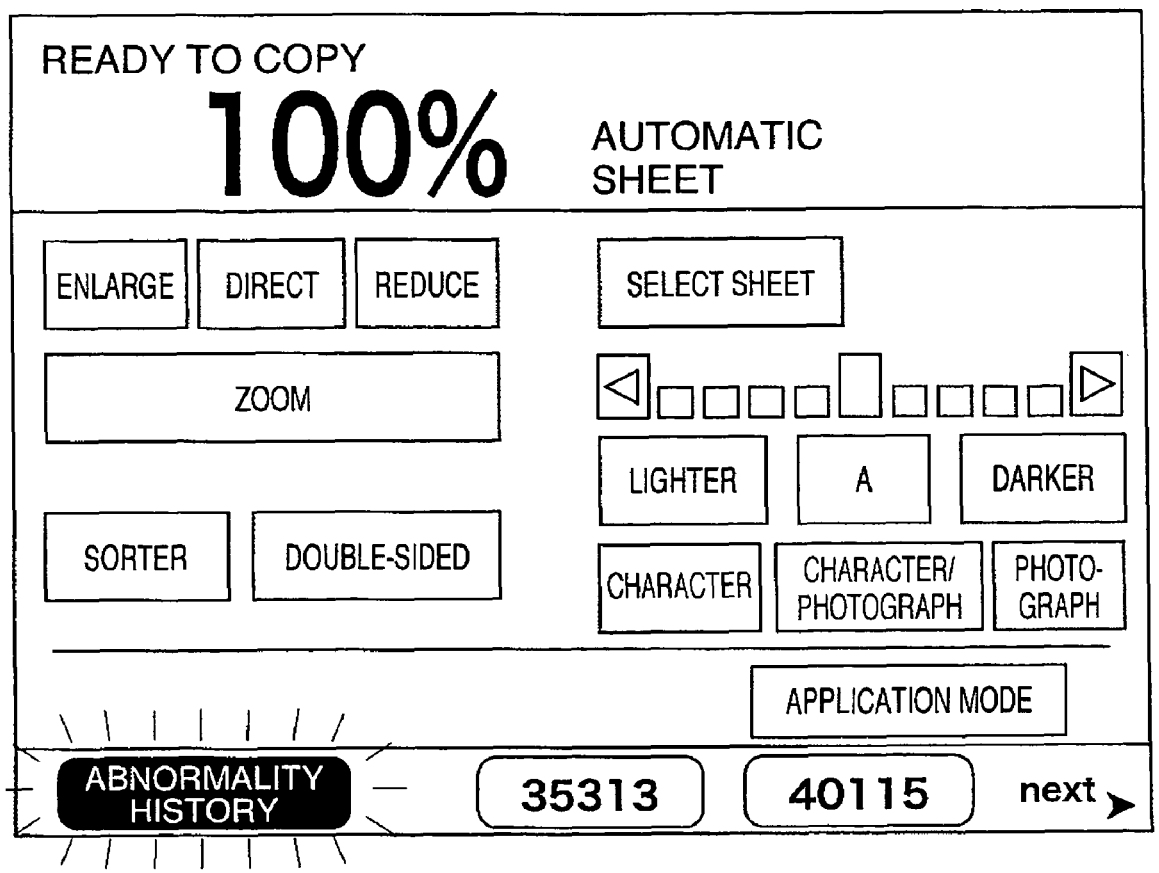
FIG. 11 is a view showing an example of an initialization screen displayed in the case where history information is registered.
Figure 12:
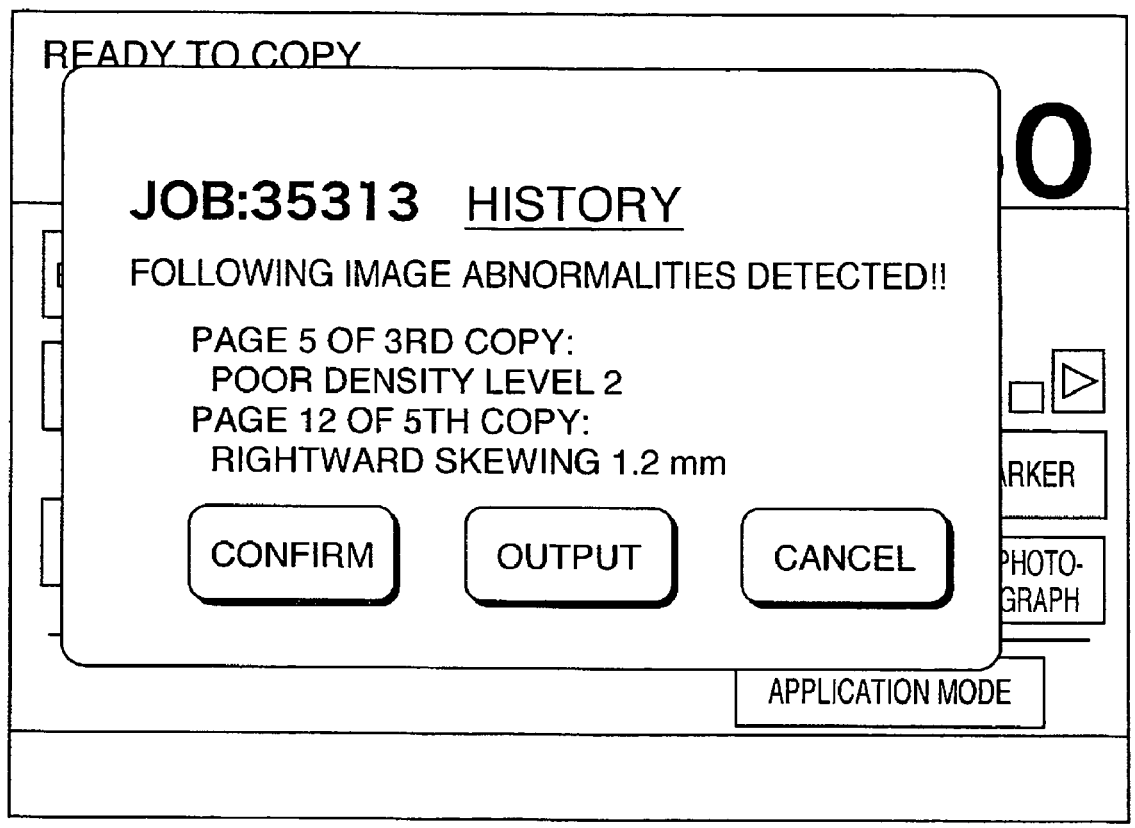
FIG. 12 is a view showing an example of a screen on which history information of a job number selected on the screen shown in FIG. 11.

Referring next to FIGS. 3 to 12, a description will be given of a process carried out in the case where an image abnormality is detected in the one-side copy mode. FIGS. 3 and 4 are flow charts showing the procedure of a process carried out in the case where an image abnormality (skewing or density trouble) of the image forming apparatus 1000 in FIG. 1 is detected. FIG. 5 is a view showing an example of an initialization screen displayed on the operating section 200. FIG. 6 is a view showing an example of a screen displayed on the operating section 200 during one-side copying. FIG. 7 is a view showing an example of an image abnormality notifying screen displayed on the operating section 200. FIG. 8 is a view showing an example of a retry screen displayed in the case where a "Retry" button is selected on the image abnormality notifying screen in FIG. 7. FIG. 9 is a view showing an example of a page number designating screen displayed on the operating section 200. FIG. 10 is a view showing an example of a job completion notifying screen displayed on the operating section 200. FIG. 11 is a view showing an example of an initialization screen displayed on the operating section 200 in the case where history information has been registered. FIG. 12 is a view showing an example of a screen showing history information of a job number selected on the screen in FIG. 11. The procedure in the flow charts of FIGS. 3 and 4 is carried out by the controller 100 (CPU).

When the image forming apparatus 1000 is on standby, a screen as shown in FIG. 5 is displayed on the operating section 200. The image forming apparatus 1000 is on standby with the one-sided copy mode set as default. In making copies in the one-sided copy mode, the number of copies, for example, as well as magnification, sheet type, density, etc. is selected on the screen in FIG. 5. If a user wants to select the double-sided copy mode, depressing a "Double-sided" button causes the double-sided copy mode to be set.

When a start key is depressed with the one-sided copy mode selected, copying in the one-sided copy mode is started. The controller 100 provides control such that a screen as shown in FIG. 6 is displayed on the operating section 200. A message "Now copying" that indicates copying is under way and a job number ("35313" in the illustrated example) are displayed on the screen in FIG. 6.

During copying, the controller 100 carries out the image abnormality detecting process in FIGS. 3 and 4. In a step S1, the controller 100 determines whether or not an image abnormality has been detected. Here, the controller 100 inputs information read from a sheet 30 by the line sensor 500 and detects an image abnormality (sheet skewing or density trouble) based on the input information using the above described algorithm. If no image abnormality has been detected, the controller 100 then determines in a step S13 whether or not the job has been completed. If the job has not been completed yet, the process returns to the step S1 wherein the controller 100 monitors abnormality detection of an image to be subsequently formed. On the other hand, if the job has been completed, the process proceeds to a step S14 in FIG. 4.

If it is determined in the step S1 that an image abnormality has been detected, the process proceeds to a step S2 wherein the controller 100 stores information or identifying a sheet of which image abnormality has been detected, i.e. a job number and information indicative of what page number of what copy number is the sheet in an area 1 that is set in advance in the RAM of the controller 100. What page number of what copy number is the sheet of which image abnormality has been detected is calculated based on the number of times the leading edge of a sheet is detected by the image sensor 500 as mentioned above. The process then proceeds to a step S3 wherein the controller 100 stores information indicative of the contents of the image abnormality (for example, information indicative of skewing, a skewed amount of 1.2 mm, and so forth) in an area 2 that is set in advance in the RAM.

The process then proceeds to a step S4 wherein the controller 100 temporarily halts the apparatus to suspend the execution of the job. It should be noted that even if the execution of the job is suspended, sheets being conveyed at the time point the image abnormality was detected continue to be conveyed and are discharged. Further, in the step S4, the controller 100 displays an image abnormality notifying screen for selecting processing to cope with the image abnormality on the operating section 200. Here, a screen as shown in FIG. 7 is displayed as the image abnormality notifying screen. The information stored in the areas 1 and 2 of the RAM, i.e. "JOB: 35313" as a job number, "Page 5 of 3rd copy" as identification information indicative of the sheet of which image abnormality has been detected, and "Density trouble level 2" as the contents of the image abnormality on the sheet are displayed on the image abnormality notifying screen. Further, "Stop", "Continue", and "Retry" button s for selecting subsequent processing are displayed on the image abnormality notifying screen. Here, the "Density trouble density level 2" means that there occurs density trouble at a level 2 among a plurality of levels of density trouble set in advance in dependence on differences between detected values and reference values. The "Retry" button can be depressed only after the "Stop" button is selected. It should be noted that the "Retry" button may be hatched so as not to be selectable when an image abnormality is detected. Here, in the case where the user desires a high-quality image and hence the occurrence of an image abnormality is not allowed, the "Stop" button is selected. The reason why the apparatus is temporarily halted is to make it possible for the user to take out the sheet of which image abnormality has been detected from the apparatus, check the degree of the image abnormality, and determine subsequent processing to be performed.

Next, in a step S5, the controller 100 determines whether the "Stop" button has been depressed or "Continue" button has been depressed on the image abnormality notifying screen. If the "Continue" button has been depressed, the process proceeds to a step S12 wherein the controller 100 resumes copying from a page next to a page corresponding to the sheet of which image abnormality has been detected. In the case where, for example, a sorting function has been set in the present job, copying is resumed without changing the contents of this setting. The process then proceeds to the step S13 wherein the controller 100 determines whether or not the job has been completed. If all the job has not been completed, the process returns to the step S1 wherein the controller 100 monitors image abnormality detection. On the other hand, if all the job has been completed, the process proceeds to the step S14 in FIG. 4.

If it is determined in the step S5 that the "Stop" button has been depressed, the controller 100 enables the "Retry" button to be depressed and waits for depression of the "Retry" button in a step S6. The steps S5 and S6 are intended to cause the user to determine whether or not it is necessary to retry image formation.

If it is determined in the step S6 that the "Retry" button has been depressed, the process proceeds to a step S7 wherein the controller 100 displays a retry screen as shown in FIG. 8 on the operating section 200 and determines which button has been depressed on the retry screen. The retry screen is intended to select a page to be recopied. An "ERROR page" button, a "Page designation" button, and an "Abort" button are displayed on the retry screen. The "ERROR page" button is depressed in setting a page of which image abnormality has been detected as a page from which image formation is to be retried. The "Page designation" button is depressed when the user designates a page from which image formation is to be retried. The "Abort" button is depressed in canceling the job. It is then determined which one of the "ERROR page" button, the "Page designation" button, and the "Abort" button has been depressed.

If it is determined in the step S7 that the "Abort" button has been depressed, the controller 100 cancels the job, and the process then proceeds to the step S14 in FIG. 4.

It may be configured such that on the screen in FIG. 7, if the "Stop" button is depressed, the present print job is canceled, and if the "Retry" button is depressed, the screen in FIG. 8 is displayed.

If it is determined in the step S7 that the "ERROR page" button has been depressed, the process proceeds to a step S11 wherein the controller 100 resumes copying from the page of which image abnormality has been detected. The process then proceeds to the step S13 wherein the controller 100 determines whether or not all the job has been completed. If all the job has not been completed yet, the process returns to the step S1 wherein the controller 100 monitors abnormality detection of an image to be subsequently formed. On the other hand, if all the job has been completed, the process proceeds to the step S14 in FIG. 4.

It should be noted that in the case where an image had been formed on the next recording sheet at the time point the image abnormality was detected, image abnormality detection is carried out with respect to this recording sheet as well. If an image abnormality formed on the next recording sheet is detected, the detected abnormality as well as the previously detected abnormality is displayed on the image abnormality notifying screen.

If it is determined in the step S7 that the "Page designation" button has been depressed, the process proceeds to a step S8 wherein the controller 100 displays a retry page number designating screen as shown in FIG. 9 on the operating section 200 so as to prompt the user to input a number of a page to be recopied. A number of a page to be recopied can be input to the retry page number designating screen. For example, if the user ascertains that an image on the page of which image abnormality has been detected is acceptable for use, he/she inputs a number of the next page. Since the user can confirm a number of a page of which image abnormality has been detected on the screen in FIG. 7, he/she can easily input a page number. In the illustrated example, the page of which image abnormality has been detected is Page 5, Page 6 is input as a page to be recopied. To fix this input, an "OK" button is depressed, and to return from the retry page number designating screen to the image abnormality notifying screen, a "Return" button is depressed.

Next, in a step S9, the controller 100 determines whether the "OK" button has been depressed or the "Return" button has been depressed on the retry page number designating screen. If the "Return" button has been depressed, the controller 100 erases the retry page number designating screen and displays the image abnormality notifying screen, and the process then returns to the step S6. On the other hand, if the "OK" button has been depressed, the process proceeds to a step S10 wherein the controller 100 resumes copying from the page with the page number input on the retry page number designating screen. The process then proceeds to the step S13 wherein the controller 100 determines whether or not the job has been completed. If the job has not been completed yet, the process returns to the step S1 wherein the controller 100 monitors image abnormality detection to determine whether or not an image abnormality has been detected. On the other hand, if the job has been completed, the process proceeds to the step S14 in FIG. 4.

When the job is completed, the controller 100 displays a job completion notifying screen as shown in FIG. 10 in the step S14 in FIG. 4. A job number, a completion message, the presence or absence of an image abnormality, contents of the image abnormality, a page on which the image abnormality has been detected, and so forth are displayed on the job completion notifying screen. Also, a "Confirm" button, an "Output" button, and a "Cancel" button are displayed. The job completion notifying screen in the illustrated example is displayed in the case where an image abnormality has been detected. In a step S15, the controller 100 determines which one of the "Confirm" button, the "Output" button, and the "Cancel" button has been depressed on the job completion notifying screen.

If it is determined in the step S15 that the "Confirm" button has been depressed, the controller 100 determines that the presence of the image abnormality in the present job has been confirmed, followed by terminating the process without storing the contents displayed on the job completion notifying screen as history information.

If it is determined in the step S15 that the "Output" button has been depressed, the process proceeds to a step S16 wherein the controller 100 prints out the contents displayed on the job completion notifying screen (the job number, the completion message, the presence of the image abnormality, the contents of the image abnormality, and the page of which the image abnormality has been detected), followed by terminating the process.

If it is determined in the step S15 that the "Cancel" button has been depressed, the process proceeds to a step S17 wherein the controller 100 registers the contents displayed on the job completion notifying screen (the job number, the completion message, the presence of the image abnormality, the contents of the image abnormality, and the page of which the image abnormality has been detected) as history information, followed by terminating the process.

Here, in the case where job history information has been registered, an "Abnormality history" button for referring to the registered history information is displayed on an initial screen displayed or a screen displayed during the execution of a job on the operating section 200 when the image forming apparatus 1000 is on standby or during the execution of a job. For example, a screen as shown in FIG. 11 is displayed. Here, when the "Abnormality history" button is depressed, a list of job numbers in the registered history information is displayed. In the illustrated example, history information on a plurality of jobs has been registered, and hence job numbers of the respective jobs are displayed. Also, in the case where a "next" button is displayed as in the illustrated example, job numbers of the next registered history information are displayed.

When a job number "35313", for example, is depressed on the above screen, a screen that shows information corresponding to this job number, e.g. a screen as shown in FIG. 12 is displayed. If a "Confirm" button is depressed on the screen in FIG. 12, the history information on this job is erased. If an "Output" button is depressed on the screen in FIG. 12, the history information on this job is printed out on a sheet. If a "Cancel" button is depressed on the screen in FIG. 12, the screen that shows the history information on this job is erased, and the screen in FIG. 11 is displayed again.

Figure 13:
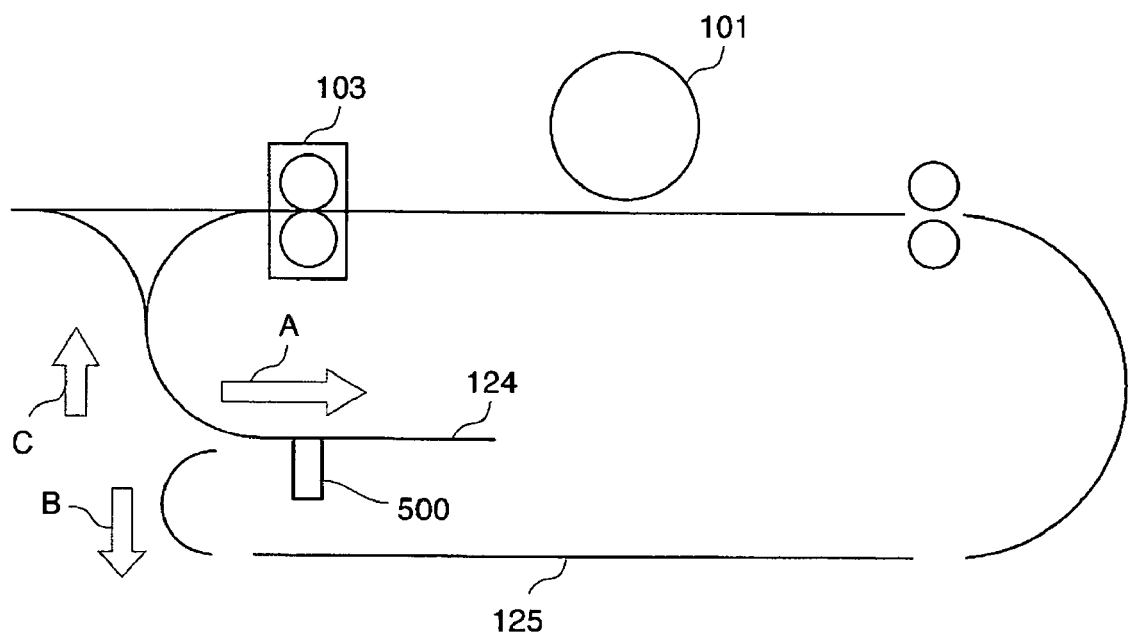
FIG. 13 is a view schematically showing a conveying path for a sheet in a double-sided copy mode of the image forming apparatus.

Referring next to FIG. 13, a description will be given of how an image abnormality is detected in the double-sided copy mode. FIG. 13 is a view schematically showing a path over which a sheet is conveyed in the double-sided copy mode of the image forming apparatus in FIG. 1.

In the one-sided copy mode, a sheet having an image formed thereon is guided once to the sheet inverting path 124 for face down discharge as described above, and on this occasion, the above-mentioned image abnormality detection is carried out with respect to the sheet using the line sensor 500. The sheet is then switched back to be conveyed in a direction reverse to a direction A and conveyed in a direction C to be discharged to the finisher.

In the double-sided copy mode, a sheet having an image formed on the one side (the first side) thereof is conveyed in the direction A from the fixing unit 103 and guided once to the sheet inverting path 124 and subjected to the above-mentioned image abnormality detection. The sheet is then switched back to be conveyed in the direction reverse to the direction A and conveyed in a direction B to be guided to the sheet re-feeding path 125. The sheet that has passed through the sheet re-feeding path 125 is fed toward the photosensitive member 101, and a toner image is transferred onto the other side (the second side) of the sheet. The sheet onto which the toner image has been transferred is directly discharged to the finisher via the fixing unit 103 without being guided to the sheet inverting path 124.

It should be noted that in the case where a line sensor for the second side of a sheet is provided between the fixing unit 103 and the sheet discharge port, whether or not there is an image abnormality formed on the second side is determined in the double-sided copy mode.

As described above, according to the present embodiment, image abnormality detection is carried out with respect to a sheet having an image formed thereon, and information indicative of what page number of what copy number is the sheet of image abnormality has been detected and the contents of the detected image abnormality are notified to the user. As a result, the user can easily identify the sheet of which image abnormality has been detected and check the degree of the image abnormality, and can determine subsequent processing to be performed according to the checking result. Also, when an image abnormality is detected, it is possible to determine whether a job is to be discontinued or continued after temporarily suspending the execution of the job, and therefore downtime can be reduced to the minimum possible level.

Also, since the image sensor 500 is disposed at a location downstream of the fixing unit 103 in the conveying direction, i.e. the image sensor 500 is disposed on the sheet inverting path 124, image abnormality detection can be carried out without complicating the arrangement therefor in both the one-sided copy mode and the double-sided copy mode.

Further, since the image sensor 500 is implemented by a CIS, the costs of image abnormality detection can be reduced as compared with the case where the image sensor 500 is implemented by, for example, a CCD.

Second Embodiment

Figure 14:
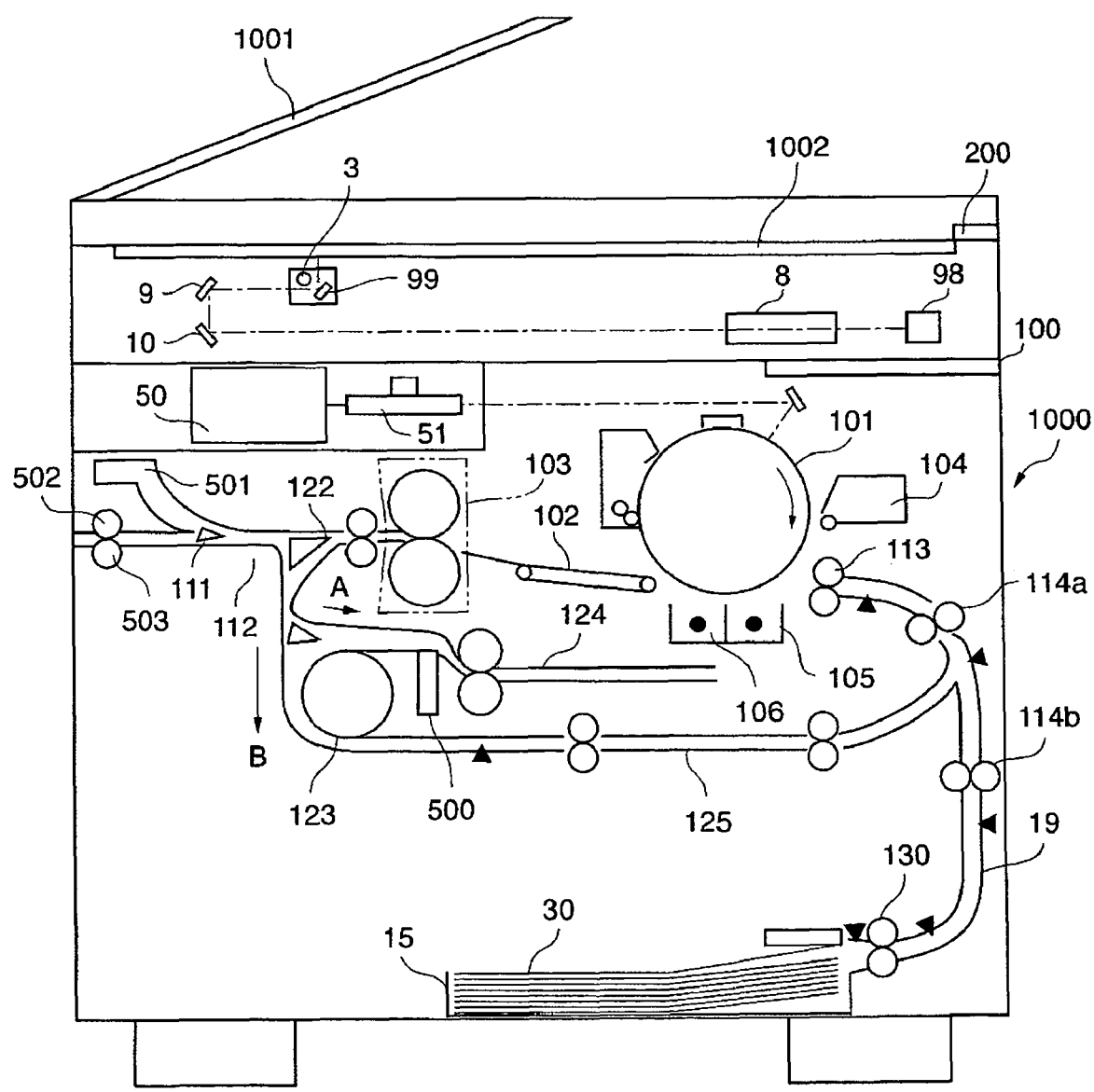
FIG. 14 is a longitudinal sectional view showing the construction of an image forming apparatus according to a second embodiment of the present invention.

Referring next to FIG. 14, a description will be given of a second embodiment of the present invention. FIG. 14 is a longitudinal sectional view showing the construction of an image forming apparatus according to the second embodiment.

The present embodiment differs from the first embodiment described above in that there is provided an escape tray 501 that holds sheets of which image abnormalities have been detected. Here, members and functional blocks corresponding to those of the first embodiment are denoted by the same reference numerals, and description thereof is omitted.

Specifically, in the present embodiment, a switching flapper 111 is provided on the conveying path that connects the switching flapper 122 and the sheet discharge rollers 502 and 503 to each other. The switching flapper 111 switches the conveying direction of a sheet being conveyed from the fixing unit 103 via the switching flapper 122 either to a direction that guides the sheet to the escape tray 501 or to a direction that guides the sheet to the sheet discharge rollers 502 and 503. A sheet of which image abnormality has been detected is guided to the escape tray 501 by a switching action of the switching flapper 111, and a sheet of which image abnormality has not been detected is guided to the sheet discharge rollers 502 and 503. The escape tray 501 can be drawn out from a main body of the image forming apparatus 1000. For example, when a copy job is temporarily suspended upon detection of an image abnormality, the user can draw out the escape 501 from the main body of the image forming apparatus 1000 and visually check an image on a sheet of which image abnormality has been detected. As a result, an operation that has to be carried out by the user upon detection of an image abnormality so as to check whether or not an image on a sheet of which image abnormality has been detected is allowable can be facilitated.

It is to be understood that the object of the present invention may also be accomplished by supplying a system or an apparatus with a storage medium in which a program code of software, which realizes the functions of any of the above described embodiments is stored, and causing a computer (or CPU or MPU) of the system or apparatus to read out and execute the program code stored in the storage medium.

In this case, the program code itself read from the storage medium realizes the functions of any of the above described embodiments, and hence the program code and a storage medium on which the program code is stored constitute the present invention.

Examples of the storage medium for supplying the program code include a ROM, a floppy (registered trademark) disk, a memory card such as a PCMCIA card and a compact flash (registered trademark) card, a hard disk, a micro DAT, a magneto-optical disk, an optical disk such as a CD-R and a CD-RW, a phase change optical disk such as a DVD. Alternatively, the program code may be downloaded via a network.

Further, it is to be understood that the functions of any of the above described embodiments may be accomplished not only by executing a program code read out by a computer, but also by causing an OS (operating system) or the like which operates on the computer to perform a part or all of the actual operations based on instructions of the program code.

Further, it is to be understood that the functions of any of the above described embodiments may be accomplished by writing a program code read out from the storage medium into a memory provided in an expansion board inserted into a computer or a memory provided in an expansion unit connected to the computer and then causing a CPU or the like provided in the expansion board or the expansion unit to perform a part or all of the actual operations based on instructions of the program code.

What is claimed is:

1. An image forming apparatus comprising:
an operating unit that displays information for a user and inputs an instruction from the user;
an image forming unit that carries out a print job to thereby form an image on a recording sheet;
an abnormality detecting unit that detects an abnormality of the image formed on the recording sheet after the image is formed on the recording sheet by said image forming unit;
a controller that controls suspending the print job when the abnormality is detected by said abnormality detecting unit during the print job being carried out by said image forming unit, in the case where the print job is a print job for printing images on at least one set of a plurality of pages; and
a display controller that causes said operating unit to display a screen for prompting the user to give an instruction as to whether to continue the print job after the print job is suspended, and display identification information for identifying the recording sheet on which image is detected to be abnormal;
wherein in the case where the instruction from the user inputted to said operating unit indicates continuing the suspended print job, said controller resumes the suspended print job without retrying the formation of the image detected to be abnormal on a recording sheet;

in the case where the instruction from the user inputted to said operating unit indicates cancelling the suspended print job, said controller cancels the suspended print job without retrying the formation of the image detected to be abnormal on a recording sheet; and in the case where the instruction from the user inputted to said operating unit indicates retrying the suspended print job and a page selected by the user among the at least one set of the plurality of pages, said controller resumes the suspended job from forming the image on the page selected by the user.

2. An image forming apparatus according to claim 1, wherein said display controller causes said operating unit to display contents of the detected abnormality when said abnormality detecting unit detects the image abnormality.

3. An image forming apparatus according to claim 1, wherein said image forming unit comprises a fixing unit that fixes the image onto the recording sheet, and said abnormality detecting unit comprises an image sensor provided at a location downstream of said fixing unit.

4. An image forming apparatus according to claim 3, comprising a sheet inverting unit that inverts the recording sheet onto which the image has been fixed by said fixing unit, and wherein said image sensor is provided to detect the abnormality of image formed on the sheet conveyed to said sheet inverting unit.

5. An image forming apparatus according to claim 3, wherein said abnormality detecting unit detects one of density trouble of the image formed on the recording sheet and skewing of the recording sheet based on an output from said image sensor.

6. An image forming apparatus according to claim 1, comprising a registering unit that registers the abnormality detected by said abnormality detecting unit as history information.

7. An image forming apparatus according to claim 1, comprising a temporary holding unit that holds recording sheets of which abnormalities have been detected by said abnormality detecting unit in a manner being distinguished from recording sheets of which abnormalities have not been detected.

8. A method of controlling an image forming apparatus, comprising:

an operating step of displaying information for a user and inputting an instruction from the user;

an image forming step of carrying out a print job to thereby form an image on a recording sheet;

an abnormality detecting step of detecting an abnormality of the image formed on the recording sheet after the image is formed on the recording sheet in said image forming step;

a suspending step of suspending, when the abnormality is detected in said abnormality detecting step, the print job after discharging the recording sheet on which the image detected to be abnormal is formed, in the case where the print job is a print job for printing images on at least one set of a plurality of pages, even if a set of the at least one set of the print job has been carried out;

a notifying step of notifying identification information for identifying the recording sheet of which abnormality has been detected when the abnormality is detected in said abnormality detecting step;

an input step of inputting an instruction from a user after the print job is suspended; and a first controlling step of resuming the suspended print job without retrying the formation of the image detected to be abnormal on a recording sheet, in the case where the instruction inputted in said input step indicates continuing the print job;

a second controlling step of cancelling the suspended print job without retrying the formation of the image detected to be abnormal on a recording sheet, in the case where the instruction inputted in said input unit indicates cancelling the suspended print job; and a third controlling step of resuming, in the case where the instruction from the user inputted to said operating unit indicates retrying the suspended print job and a page selected by the user among the at least one set of the plurality of pages, the suspended print job from forming the image on the page selected by the user.

9. A method of controlling an image forming apparatus according to claim 8, wherein contents of the detecting abnormality is notified to the user in said notifying step.

10. A non-transitory machine readable medium encoded with a program for causing a computer to execute a method of controlling an image forming apparatus, comprising: an operating module for displaying information for a user and inputting an instruction from the user; an image forming module for carrying out a print job to thereby form an image on a recording sheet; an abnormality detecting module for detecting an abnormality of the image formed on the recording sheet after the image is formed on the recording sheet in said image forming module; a suspending module for suspending, when the abnormality is detected in said abnormality detecting module, the print job after discharging the recording sheet on which the image detected to be abnormal is formed, in the case where the print job is a print job for printing images on at least one set of a plurality of pages, even if a set of the at least one set of the print job has been carried out;

a notifying module for notifying identification information for identifying the recording sheet of which abnormality has been detected when the abnormality is detected in said abnormality detecting module; an input module for inputting an instruction from a user after the print job is suspended; and a first controlling module for resuming the suspended print job without retrying the formation of the image detected to be abnormal on a recording sheet, in the case where the instruction inputted in said input module indicates continuing the print job; a second controlling module for cancelling the suspended print job without retrying the formation of the image detected to be abnormal on a recording sheet, in the case where the instruction inputted in said input unit indicates cancelling the suspended print job; and a third controlling module for resuming, in the case where the instruction from the user inputted to said operating unit indicates retrying the suspended print job and a page selected by the user among the at least one set of the plurality of pages, the suspended print job from forming the image on the page selected by the user.

* * * * *